US011951764B1

(12) United States Patent
O'Rourke

(10) Patent No.: US 11,951,764 B1
(45) Date of Patent: *Apr. 9, 2024

(54) DRY ERASE MARKER BOARD SYSTEM WITH SOLID WETTING MARKER BOARD

(71) Applicant: AnteMilan, LLC, San Jose, CA (US)

(72) Inventor: Diane K. O'Rourke, San Jose, CA (US)

(73) Assignee: ANTEMILAN, LLC, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/991,745

(22) Filed: Nov. 21, 2022

Related U.S. Application Data

(60) Division of application No. 16/796,780, filed on Feb. 20, 2020, now Pat. No. 11,504,995, which is a continuation-in-part of application No. 16/156,727, filed on Oct. 10, 2018, now Pat. No. 11,021,005, which is a continuation-in-part of application No. 15/428,994, filed on Feb. 9, 2017, now Pat. No. 10,852,006.

(51) Int. Cl.

| | |
|---|---|
| ***B43L 1/00*** | (2006.01) |
| ***B43L 1/06*** | (2006.01) |
| ***B43L 1/10*** | (2006.01) |
| *B43K 8/02* | (2006.01) |

(52) U.S. Cl.
CPC .................. *B43L 1/10* (2013.01); *B43L 1/06* (2013.01); *B43K 8/02* (2013.01)

(58) Field of Classification Search
CPC .. B43L 1/00; B43L 1/002; B43L 1/008; B43L 1/12; B43L 1/126
See application file for complete search history.

(56) References Cited

U.S. PATENT DOCUMENTS

| | | | |
|---|---|---|---|
| 3,983,298 | A | 9/1976 | Hahn et al. |
| 4,534,815 | A | 8/1985 | Hamada et al. |
| 4,980,396 | A | 12/1990 | Yoshida |
| 5,120,810 | A | 6/1992 | Fujiki et al. |
| 5,436,303 | A | 7/1995 | Lin |
| 6,409,874 | B1 | 6/2002 | Aar et al. |
| 7,799,387 | B2 | 9/2010 | Drake et al. |
| 8,556,637 | B2 | 10/2013 | Domey et al. |
| 10,280,333 | B2 | 5/2019 | Shah |
| 10,287,453 | B2 | 5/2019 | Ho et al. |
| 2004/0018345 | A1 | 1/2004 | Athorn-Telep et al. |

(Continued)

OTHER PUBLICATIONS

LULALU Stripe Weekly Paper Pad the Grips, 10×10 inches LU-P952, https://www.amazon.com/lulalu-stripe-weekly-10-inches-lu-p9, Jul. 15, 2011, 6 pages.

(Continued)

*Primary Examiner* — Kurt Fernstrom

(74) *Attorney, Agent, or Firm* — Compass IP Law PC

(57) ABSTRACT

A marker board system having a dark colored, low hardness, low surface energy solid silicone sheet to wet to a vertically oriented high surface energy substrate on a smooth, flat back-side of the solid silicone sheet. A front-side of the solid silicone sheet is able to be written upon by brightly colored marker ink. The brightly colored marker ink is able to be easily erased from the front-side of the solid silicone sheet after being written upon the front-side of the solid silicone sheet. The front-side is roughened to diminish beading of the brightly colored marker ink when written on the front-side.

17 Claims, 7 Drawing Sheets

(56) References Cited

U.S. PATENT DOCUMENTS

| | | | |
|---|---|---|---|
| 2004/0182281 | A1 | 9/2004 | Kwan |
| 2005/0000642 | A1 | 1/2005 | Everaerts et al. |
| 2006/0024463 | A1 | 2/2006 | Gustafson et al. |
| 2006/0257200 | A1 | 11/2006 | Busam et al. |
| 2007/0094904 | A1 | 5/2007 | Frank et al. |
| 2007/0142517 | A1 | 6/2007 | Anderson et al. |
| 2009/0130362 | A1 | 5/2009 | Egan |
| 2010/0092671 | A1 | 4/2010 | Goscha et al. |
| 2012/0224264 | A1 | 9/2012 | Chiba et al. |
| 2013/0029311 | A1 | 1/2013 | Goscha |
| 2014/0106132 | A1 | 4/2014 | Hong et al. |
| 2014/0335296 | A1 | 11/2014 | Wang |
| 2015/0125846 | A1 | 5/2015 | Langford |
| 2016/0271997 | A1 | 9/2016 | Berniard et al. |
| 2017/0107398 | A1 | 4/2017 | Ho et al. |

OTHER PUBLICATIONS

"Customized Static Cling Service Reminders", http://ecpplus.com/ca/product/customized-static-cling-service-reminders/, downloaded Jul. 7, 2020, 5 pages.

1st Office Action for U.S. Appl. No. 16/796,780, dated Oct. 8, 2021, 8 pages.

AMSCAN, "Halloween Icons Vinyl Window Decorations", https://www.amazon.com/Amscan-Halloween-Icons-Window-Decorations/dp/B001G8024Y, Nov. 17, 2015, 3 pages.

Chau, et al., "Dependence of the Quality of Adhesion Between Poly (Dimethylsiloxane) and Glass Surfaces on the Composition of the Oxidizing Plasma" Original Paper published Nov. 9, 2010, 11 pages.

Duncan, et al., "Measurement Good Practice Guide No. 26—Adhesive Track", ISSN 1368-6550, National Physical Laboratory, Teddington, Middlesex, UK, Jul. 1999, 26 pages.

Final Office Action for U.S. Appl. No. 16/156,727, dated Oct. 19, 2020, 7 pages.

Hawkes, et al., "Human Climbing With Efficiently Scaled Gecko-Inspired Dry Adhesives", Department of Mechanical Engineering, and Department of Applied Physics, Stanford University, J.R. Soc, Interface 12:20140675, Oct. 2014. 10 pages.

Jensen, et al. "Wetting and Phase Separation In Soft Adhesion", PNAS, vol. 112, No. 47, Nov. 24, 2015, 5 pages.

Johnston, et al., "Mechanical Characterization of Bulk Sylgard 184 for Microfluidics and Microengineering", Journal of Micromechanics and Microengineering, Feb. 28, 2014, 7 pages.

Notice of Allowance for U.S. Appl. No. 15/428,994, dated Apr. 9, 2020, 7 pages.

Notice of Allowance for U.S. Appl. No. 15/428,994, dated Jul. 29, 2020, 10 pages.

Notice of Allowance for U.S. Appl. No. 16/156,727, dated Feb. 3, 2021, 5 pages.

Notice of Allowance for U.S. Appl. No. 16/796,780, dated Jul. 18, 2022, 5 pages.

Notice of Allowance for U.S. Appl. No. 16/796,780, dated Mar. 9, 2022, 5 pages.

Office Action for U.S. Appl. No. 15/428,994, dated Sep. 13, 2019, 6 pages.

Office Action for U.S. Appl. No. 16/156,727, dated May 19, 2020, 7 pages.

Office Action for U.S. Appl. No. 16/156,727, dated Oct. 19, 2020, 12 pages.

Restriction Requirement for U.S. Appl. No. 15/428,994, dated May 21, 2019, 5pages.

Siconi Collection, 2" Small Sticky Pad, Blue, https://www.amazon.com/gp/product/B00DRIN6AS/ref=ppx_yo_dt_b_search_asin_title?ie=UTF8&th=1, Jul. 15, 2013, 5 pages.

Verneuil, et al., "Adhesion on Microstructured Surfaces", Journal of Adhesion, Feb. 2007, pp. 449-472.

Zhang, et al., "Fabrication and Characterization of Gecko-inspired Dry Adhesion, Superhydrophobicity and Wet Self-cleaning Surfaces", Elsevier Limited and Science Press, 2016, 11 pages.

DRY ERASE MARKER BOARD SYSTEM WITH SOLID WETTING MARKER BOARD

RELATED CASES

This application is a division of and claims the benefit of U.S. patent application Ser. No. 16/796,780, entitled, "DRY ERASE MARKER BOARD SYSTEM WITH SOLID WETTING MARKER BOARD" filed Feb. 20, 2020, which further claims priority to U.S. patent application Ser. No. 16/156,727, entitled, "DRY ERASE MARKER BOARD SYSTEM WITH SOLID WETTING MARKER BOARD" filed Oct. 10, 2018, which further claims priority to U.S. patent application Ser. No. 15/428,994, entitled, "APPLICATIONS OF SOLID WETTING ADHESIVES", filed Feb. 9, 2017, all which are incorporated by reference in their entirety.

FIELD OF INVENTION

The field of invention pertains generally to adhesives and, more specifically, to applications of solid wetting adhesives.

BACKGROUND

Wetting is a type of adhesion where two materials adhere to one another because one of the materials "spreads out" over the other material. A common example is the splashing of water on a window pane. A resulting bead of water, being composed of liquid, is able to spread out over the window pane. The spreading of the water bead on the window pane, by itself, causes the bead to adhere to the window pane with a force that is greater than the gravitational force that is acting on the bead (the bead of water "sticks" to the vertically oriented window pane).

A wetting adhesive force exists in the absence of macroscopic magnetic and/or electrostatic forces. That is, the adhesion is generally not the result of the bead being "charged", a priori, to a first magnetic/electrostatic polarity and the window pane being charged, a priori, to an opposite magnetic/electrostatic polarity. Instead, the adhesion is more generally understood to be a kind of mechanical adhesion in which the physical spreading out of the adhesive on a substrate, by itself, is at the essence of the attraction between them (some deeper physical theories of wetting adhesion attribute the attraction to van der Waals forces which may involve atomic electrostatic interactions at the interface between the two materials).

Here, to the extent wetting has been used to bind two materials, the wetting material has traditionally been applied as a liquid to promote its spreading out over the substrate to be adhered to. An example is traditional, non reactive glue. Traditional glue is squeezed out of a nozzle as a gel or lower viscous liquid over a substrate. The glue spreads out over the surface of the substrate which causes adhesion to the substrate through wetting. The glue then hardens which secures the wetting adhesive force in place.

Here, because the glue hardens to a hard solid, removal of the glue after hardening results in permanent destruction of the adhesive bond. That is, the hardened glue can not be re-adhered to the substrate after being removed (being a hard solid, it cannot spread over again the substrate surface upon reapplication).

A pressure sensitive adhesive, such as the tacky substance on the back side of Scotch tape or a Post-It note is similar to a glue in that its adhesiveness is based on its ability to deform/spread over the substrate in response to its being pressed on the substrate. The tackiness of a pressure sensitive adhesive is characteristic of the ease at which the adhesive can be deformed (i.e., it's a gel). Additionally, unlike a glue that hardens to secure its wetting force in place, by contrast, a pressure sensitive adhesive remains in its gel state. However, repeated removal and reapplication of a pressure sensitive adhesive (such as repeated removal and reapplication of a Post-It note) tends to reduce its ability to adhere with each next reapplication. Here, because the adhesive is a gel and therefore very malleable, a tacky residue remains on the substrate with each removal leaving less adhesive for the next reapplication.

The inter-atomic and/or inter-molecular forces that bind the molecules/atoms of a solid are significantly stronger than those of a liquid (where a gel is understood to be a higher viscosity liquid). Generally, the solid's stronger atomic/molecular binding forces results in the solid being harder than a liquid. Because a liquid is not as hard as solid, a liquid has less of a propensity to keep its shape than a solid. That is, the present shape of a liquid is more easily changed than the present shape of a solid. Additionally, once the shape of the liquid is changed it exhibits little/no propensity to return to its original shape. By contrast, a solid generally demonstrates a desire to return to its original shape.

As the characteristics described just above for liquids are better suited for spreading-out and remaining in the spread-out state, adhesives that bind through wetting have traditionally been applied as a liquid.

FIGURES

A better understanding of the present invention can be obtained from the following detailed description in conjunction with the following drawings, in which.

Figure 3A:
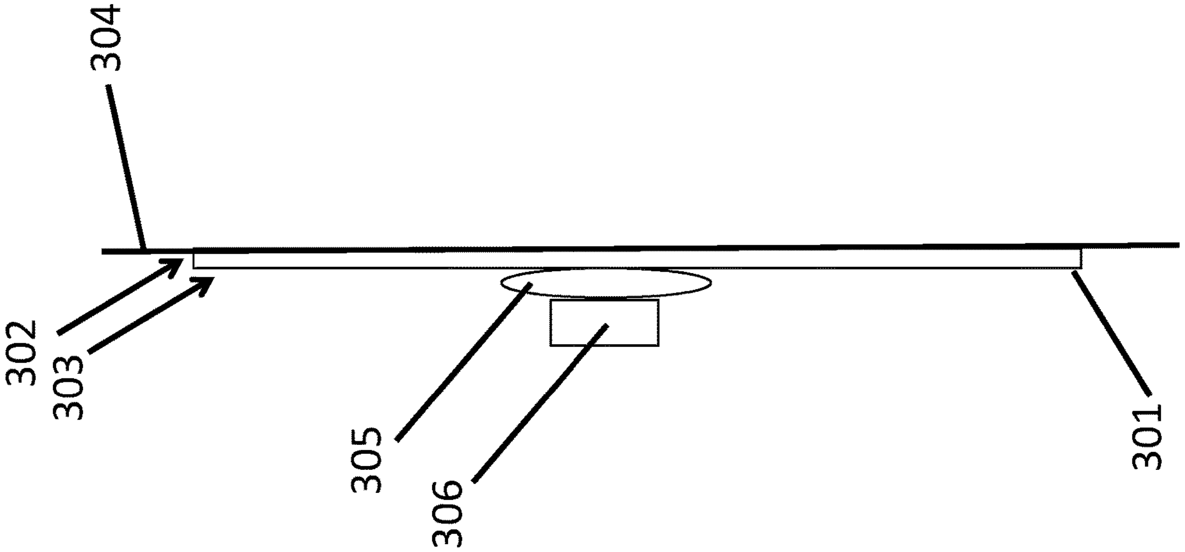
Figure 3B:
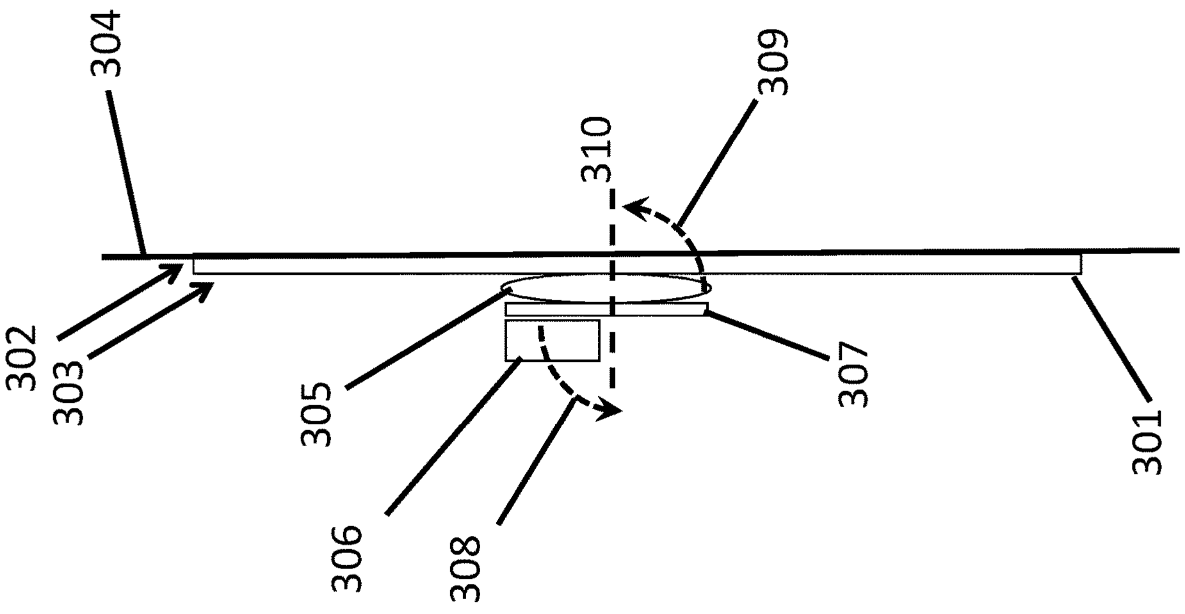
Figure 4:
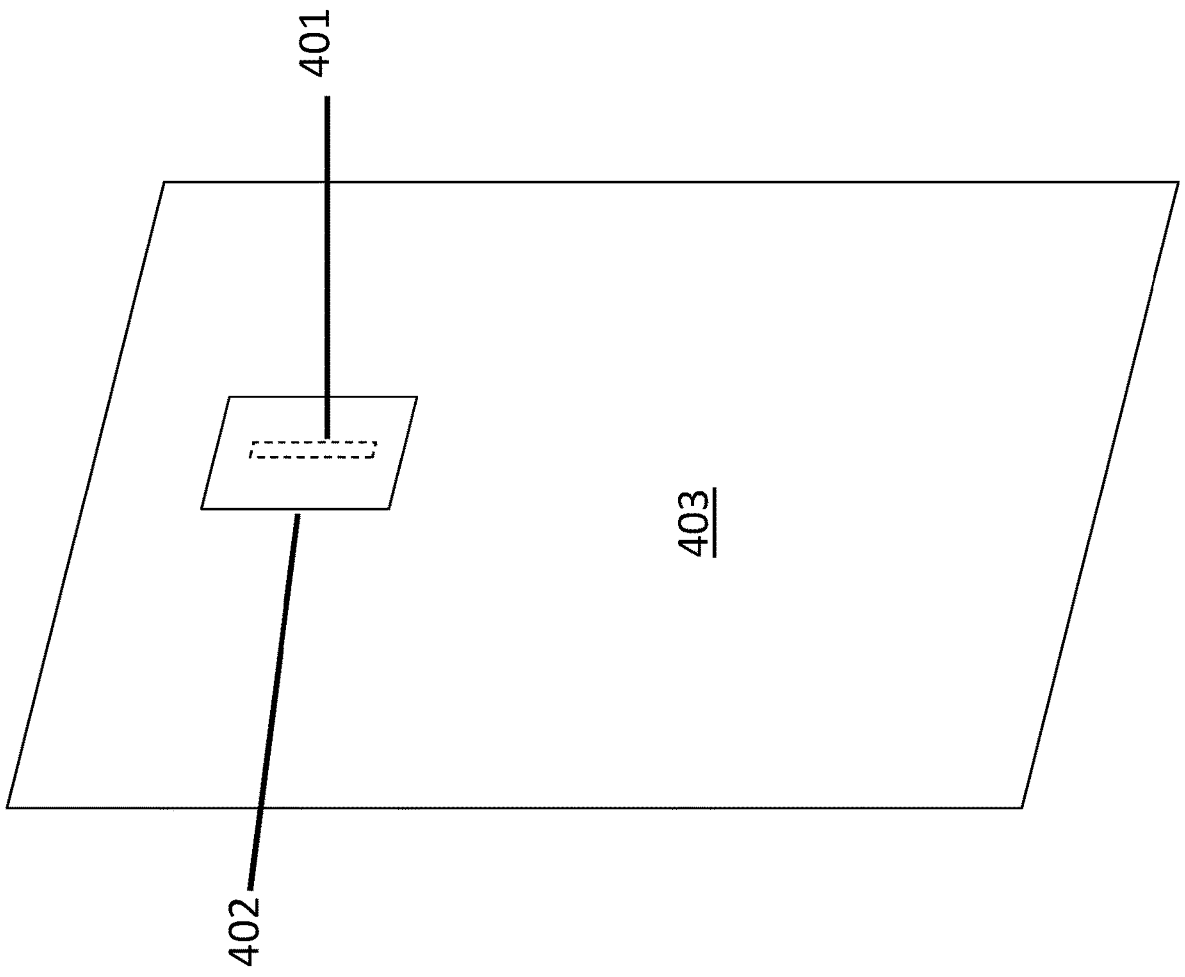
Figure 5A:
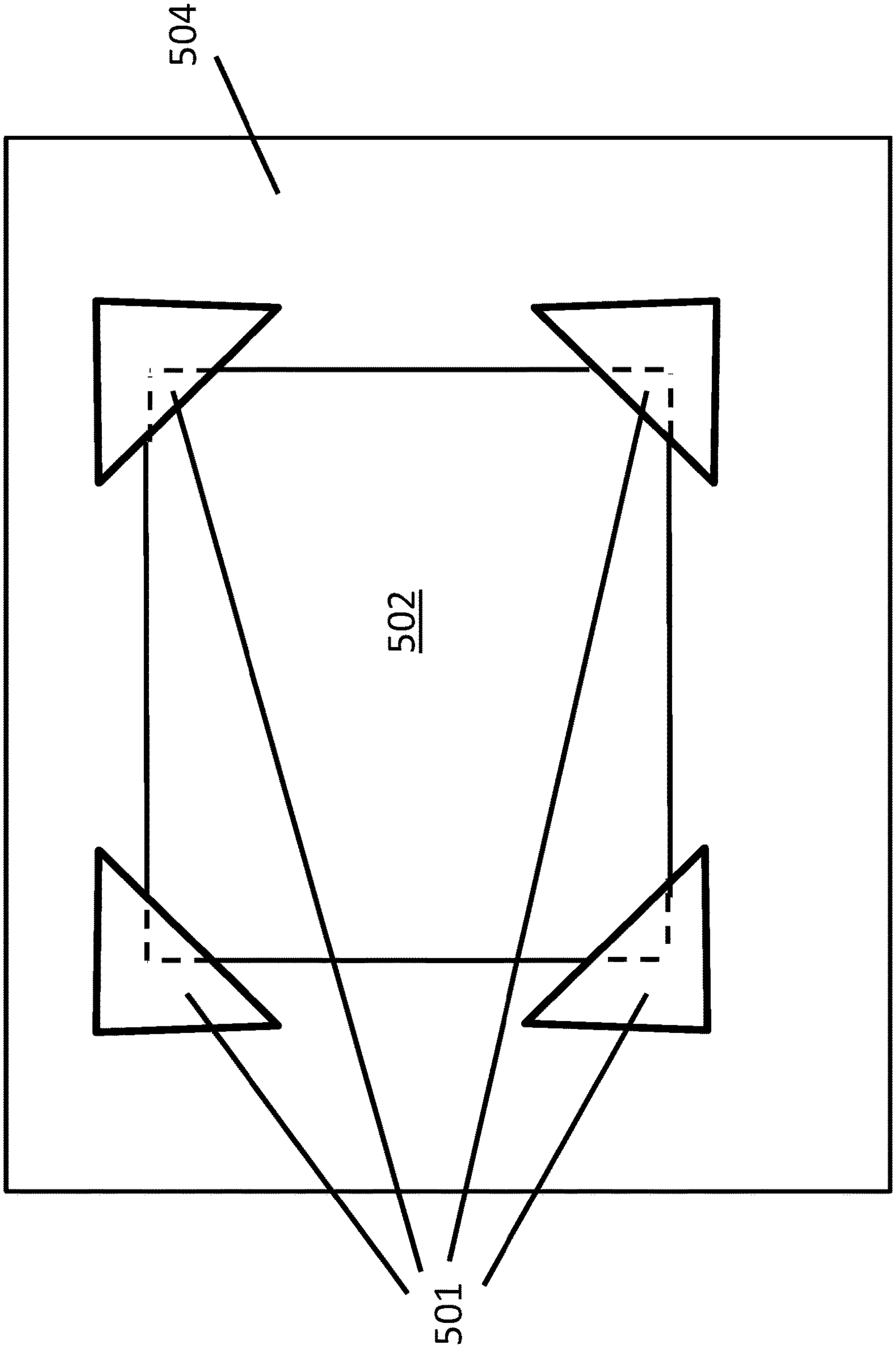
Figure 5B:
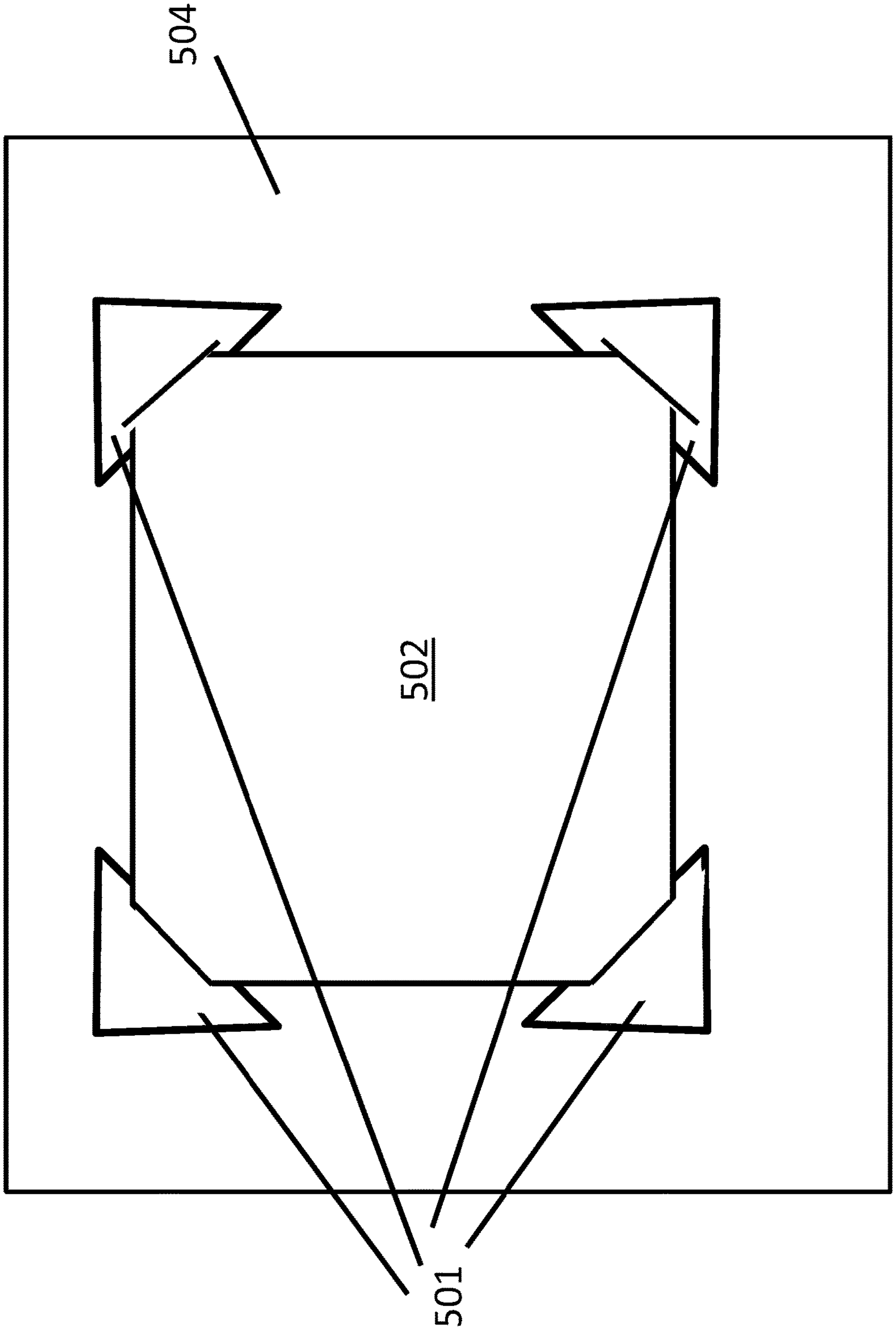

FIGS. 3*a* and 3*b* show vertical suspension systems;

FIG. 4 shows double-side adhesive tape solution;

FIGS. 5*a* and 5*b* show mounting corner adhesive solutions.

DETAILED DESCRIPTION

Described herein are various embodiments of products that utilize a non traditional type of adhesion mechanism where, the adhesive material is applied as a solid and adheres to a substrate through wetting.

As described in more detail below, in various embodiments, an adhesive that is applied to a substrate as a solid yet adheres to the substrate through wetting, hereinafter referred to as a "solid wetting adhesive", is characterized by a sufficiently lower surface energy than that of the substrate it is applied to. That is, there exits a large substrate-to-adhesive surface energy ratio or differential. For example, in various embodiments, the substrate to be adhered to has a surface energy that is 250 dynes/cm 2 or greater and the solid wetting adhesive has a surface energy that is 25 dynes/cm 2 or less and.

Additionally, in various embodiments, the solid wetting adhesive is characterized by a hardness that is within a lower hardness range for solid materials (e.g., 40 duro or less for a polydimethylsiloxane (PDMS) silicone sheet).

Finally, the interface between the solid wetting adhesive and the substrate is characterized in that both the solid wetting adhesive and the substrate have substantially smooth and flat surfaces to promote the physical spreading of the solid wetting adhesive over the substrate surface.

All three characteristics can work together to form a wetting adhesive bond. As the Applicants view the dynamics of the adhesive mechanism, the higher surface energy substrate drives the lower surface energy solid adhesive to spread outward over the substrate surface (e.g., in directions that are parallel to the substrate and adhesive surface and normal to the peripheral edges of the adhesive).

In cases where the adhesive has extremely low surface energy (such as a fluorosilicone having a surface energy below 20 dynes/cm 2), the stretching force is more extreme and the adhesive therefore need not be excessively soft (fluorosilicones having a 60 Shore A duro rating exhibit passable adhesion against high surface energy materials such as metals).

By contrast, in the case of adhesives having slightly higher surface energy than fluorosilicones (e.g., a sheet of polydimethylsiloxane (PDMS) silicone having surface energy between 20 and 25 dynes/cm 2), the stretching force applied to the adhesive by the substrate is weaker which, in turn, requires the adhesive to be made softer (less hard) so that it can more easily stretch/deform in response. That is, the reduced hardness of the adhesive permits the adhesive to actually deform/stretch/spread-out in response to the weaker induced force so as to form a wetted adhesive bond (PDMS sheets of 50 duro and preferably 40 duro or under exhibit acceptable or better adhesion to high surface energy materials).

Generally, the solid wetting adhesive may also be in the shape of a sheet to promote wetting. That is, a sheet, being more like a two dimensional surface and having a thin thickness (as opposed to a three dimensional cube), is more easily stretched laterally along its planar dimension. Here, with the surface energy differential as between the substrate and adhesive believed to be a primary determinant of good wetting behavior, it is believed that perhaps any interface can be made more favorable to wetting by reducing the thickness of the adhesive.

Candidates for solid wetting adhesives include solid elastomer sheets having low surface energy that can be manufactured with lower softness ratings. Here, solid silicone rubber sheets having low surface energy include at least polydimethylsiloxane (PDMS) sheets and fluorosilicone sheets. Solid PDMS generally demonstrates a surface energy just above 20 dynes/cm 2 (e.g. 21-23 adynes/cm$^2$). Fluorosilicones, which are fluorine modified silicones, generally exhibit surface energies below 20 dynes/cm$^2$, e.g., in a range from 12-19 dynes/cm$^2$ (e.g., polymethyltrifluoropropylsiloxane (PMTFPS) 18.3 dynes/cm$^2$, polymethylnonafluorohexylsiloxane (PMNFHS) 14.6 dynes/cm$^2$, polytetrafluroethylene (PTFE) 19.1 dynes/cm$^2$, polyhexafluoropropylene (PHFP) 12.4 dynes/cm$^2$, polyoxyhexafluoropropylene (POHFP) 18.4 dynes/cm$^2$, polyheptadecafluorodecylmethylsiloxane 12.7 dynes/cm$^2$. etc.).

Additionally, PDMS can be readily manufactured at varying degrees of lesser hardness, e.g., 50, 40, 30, 20, 10 shore A duro (hereinafter, simply "duro"), and flurosilicones can be readily manufactured at least as low as 45 duro. Here, as is known in the art, shore A duro corresponds to the type A durometer measurement scale described by ASTM D2240. Lower duro number corresponds to reduced hardness or increased softness.

The Applicants have observed strong solid wetting adhesion of PDMS and flurosilicone silicone sheets to high surface energy vertically oriented substrates. For instance, a 30 duro, colorless, 1 mm thick, 5.75"×5.75" sheet of PDMS was able to support a vertically suspended 25 oz weight indefinitely from both glass and stainless steel vertically oriented substrates (approximately at least 0.75 ozs per square inch of adhesive strength=0.047 pounds per square inch of adhesive strength).

Here, glass and metals typically have surface energies approximately within a range of 250-1100 dynes/cm$^2$. Thus, good adhesion has been observed where the ratio of substrate surface energy to adhesive surface energy is approximately 10:1 or greater and the softness is sufficient to permit stretching/spreading by the adhesive as a function of the substrate to adhesive surface energy differential.

Here, it is pertinent to recognize that low surface energy silicones have already received widespread commercial use as "non-stick" surfaces rather than as adhesive surfaces. For example, fluorosilicones are commonly used as the easily removable non-stick backing applied to the tacky back side of adhesive labels or tapes for packaging/shipping. Additionally, as just another example, the aforementioned PTFE flurosilicone is more commonly referred to as Teflon which is widely known and used as a non-stick surface for many products (e.g., cookware).

Here, as described above, the Applicant's basic model of wetting adhesion is that a higher surface energy substrate applies a stretching force to a lower surface energy solid wetting agent (the solid wetting adhesive). This force increases with increasing substrate-to-adhesive surface energy ratio. Low surface energy silicones, such as PDMS and fluorosilicones, have traditionally been used as the substrate for such interfaces where no adhesion is desired (the "non-stick" surface). In this case, the substrate has too low a surface energy to induce any stretching force to whatever material is applied to it. By contrast, the Applicant's invention lies in recognizing that a lower surface energy material can be forcefully driven to stretch by a high surface energy substrate and therefore can be made to behave as the wetting agent for strongly adhesive interfaces rather than as a substrate for non-stick interfaces.

Although solid wetting adhesives are truly solids in that they exhibit more resistance to change in shape than gels or liquids (and at least in some cases also exhibit a desire to return to original shape after being stretched), nevertheless, at least for adhesives having a surface energy above 20 dynes/cm$^2$ (such as PDMS), such adhesives exhibit less resistance to change in shape than most solids (they are more easily deformed than most solids, or, said differently, exhibit some elasticity). By contrast, common solids, having higher surface energy and higher hardness, will not be subject to as strong an induced force nor will easily deform in response to it such that the requisite amount of stretching needed to form a wetting bond does not occur.

In one set of experiments, a 0.8 mm thick, 60 duro sheet of blue fluorosilicone demonstrated acceptable adhesion to a stainless steel substrate whereas a 1 mm thick 60 duro sheet of clear PDMS did not demonstrate acceptable adhesion (it delaminated after a few minutes). Here, the better adhesion of the fluorosilicone is believed to be a consequence of its having lower surface energy as compared to PDMS. However, 40, 30, 20 and 10 duro sheets of 1 mm thick, clear PDMS were observed to exhibit increasingly stronger adhesion with each lower duro rating. Here, the 30 and 40 PDMS sheets exhibited adhesive strength that was at least comparable to if not better than the 60 duro fluorosilicone sheets, whereas, the 20 and 10 duro PDMS sheets exhibited better adhesive strength than the 60 duro fluorosilicone. Notably, it is conceivable that reduced softness may enable thicker sheets to demonstrate acceptable adhesion. That is, PDMS sheets as thick as at least 5 mm are believed to be suitably adhesive with the lower duro rating (e.g., 30 or less).

In general, solid wetting adhesives wet easily to substrates having larger surface area than the adhesive, whereas, the adhesive is more prone to delamination when wetted to a substrate having smaller surface area than the adhesive. That is, ideally, the substrate should have a surface area that is sufficient to completely surround the adhesive's surface area with a border of substrate around the adhesive's periphery. Here, for proper wetting, the substrate should provide the necessary "buffer" around the circumference of the adhesive so that the adhesive can stretch out over the substrate when wetting to the substrate. By contrast, where the adhesive has greater surface area than the substrate, or overlaps or extends beyond the substrate, no such region exists. The lack of substrate surface for the adhesive to wet over appears to generate a boundary problem that promotes delamination at the edges of the adhesive where it extends beyond the substrate.

Solid wetting adhesive bonds may also be additionally characterized in that they are not tacky, do not leave a hard to remove tacky residue when removed, and are capable of repeated removal and reapplication without loss of adhesiveness for a practically unlimited number of application/removal cycles.

Because solid wetting adhesives have hardness/softness properties that can generally be characterized as a softer solid, unlike the hardened glue described in the background, the solid wetting adhesive is easily removed and reapplied to a substrate (the adhesive bond is not immediately destroyed after the first removal of the wetting agent from the substrate). Additionally, because the solid wetting adhesive is truly a solid and not a liquid, it "removes clean" from the substrate unlike the pressure sensitive adhesive described in the background which can leave a tacky residue (it is worthwhile to point out that a solid sheet generally only resists change to its shape along its lateral/planar dimension (solid sheets are generally easily folded or bent)).

That is, the surface of a solid wetting adhesive remains substantially intact after removal and does not leave a hard to remove tacky residue after removal. As such, there is no substantial depletion of the substance that adheres to the substrate. From the Applicant's experience, a solid wetting adhesive can be removed and reapplied a practicably unlimited number of times without exhibiting any observable loss of adhesiveness.

Solid wetting adhesives made from silicone sheets should also assume various properties associated with silicone generally such as, to name a few, being washable, being electrically insulating, being inert, being non toxic, etc.

Solid wetting adhesives are believed to have a number of useful applications. In particular, everyday items such as glass (such as a glass window or glass door), metals (such as a stainless steel refrigerator door), hard plastics, granite and other stones, hard plastics, hard woods, etc. all have high surface energy and are therefore suitable substrate candidates for, e.g., the vertical suspension of various items from them with a solid wetting adhesive. Examples include, e.g., calendars, picture frames, mirrors, etc.

Further still, in the coming age of the internet of things (IOT) in which economically manufactured computing systems and/or smart sensors (sensors having some processing and communications intelligence), it is believed that solid wetting adhesives can be used to economically and reliably attach a smart sensor to any of these higher surface energy surfaces. For example, a smart security camera can easily be attached to any window.

Further still, entirely new classes of products are envisioned in which the solid wetting adhesive, e.g., being composed of an easily molded elastomer, not only acts as the adhesive but also acts as the primary product to be suspended itself. An example is a dry erase marker board where the marker board material that is written upon is composed of the solid wetting adhesive. Here, because of the practically unlimited number of removal/reapplication cycles that the solid wetting adhesive can endure, such a whiteboard can be removed/reapplied a practically unlimited number of times from/to one or (many) more different vertical substrate surfaces.

Another example is a back-splash guard that protects a granite/ceramic tile stove top back-splash by adhering to the granite back splash. Here, the back-splash guard itself is composed of the solid wetting adhesive. Again, because of the practically unlimited number of removal/reapplication cycles that the solid wetting adhesive can endure, and because of silicone generally being washable, such a back splash guard can be removed, washed and reapplied to a same granite back splash (or different granite back splashes) a practically unlimited number of times.

In general, the physical distance that the solid wetting adhesive stretches in response to being mated to a high surface energy substrate is not readily detectable to the human eye, yet, the strength of the adhesive bond is surprisingly strong and well beyond what one might otherwise intuitively expect.

Solid wetting adhesives tested by the Applicants also demonstrate easy removability once adhered owing to a general inability of the wetting interface to endure a peeling stress. That is, once adhered to a substrate, a sheet of solid wetting silicone is easily removed from the substrate simply by peeling an edge of the sheet away from the substrate. The easy removal/peeling stands in stark contrast to glues that harden and at least some forms of pressure sensitive adhesives such as Scotch tape.

Having provided a general discussion of solid wetting adhesives, the following discussion will describe in detail four specific applications of them. These include: 1) an easily removed/reapplied stove-top splash guard; 2) an easily removed/reapplied dry erase marker board; 3) a generic hook or other vertical suspension mechanical feature that, with a solid wetting adhesive, can be applied to any glass window/door, hard plastic window, vertically oriented metallic surface (e.g., a refrigerator door, office bay partition wall, etc.), etc. so that various items can be suspended from the same; 4) two-way adhesive tape for, e.g., a stainless steel refrigerator door that is easy to remove and that does not leave an undesirable residue upon removal; 5) corner mounting pieces to support vertical suspension of a photograph, calendar or other thin item.

1. Stove Top Splash Guard

Figure 1:
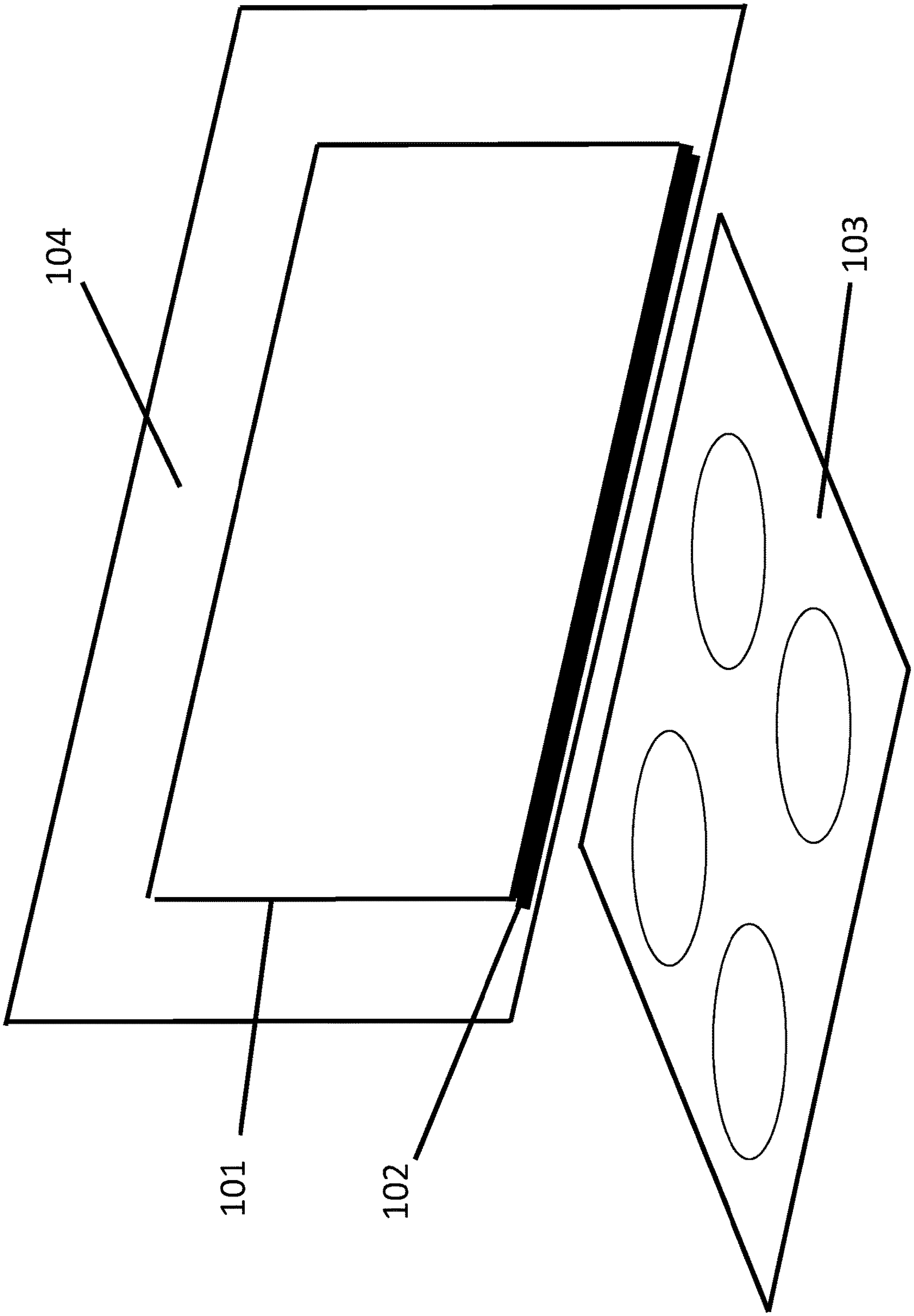
FIG. 1 shows a back splash guard.

FIG. 1 shows a depiction of a splash guard 101 composed of a solid wetting adhesive. In a basic application, the splash guard 101 is designed to protect an, e.g., granite back-splash 104 or other back-splash composed of a high surface energy material 104. As depicted in FIG. 1, the splash guard 101 has a width dimension that is approximately as wide as the stove top 103 (or wider to protect against larger splash angles).

In various embodiments, the splash guard 101 has a bottom lip 102 to prevent any splashes running off the splash guard 101 and onto the stove top surface 103. Here, note that in the case of the splashes from the stove top 103 that splash onto the splash guard 101, the splash guard 101 is behaving as a substrate for the splashes. With the splash guard 101 being composed of "traditional non-stick" material (e.g., PDMS), the splashes are more prone not to stick/wet to the splash guard 101 and will have some propensity to run down the splash guard 101 surface. Thus, the bottom lip 102 is designed to catch such splash run-off. In various embodiments, the bottom lip 102 may be more in the form of a trough having a well/depth to, e.g., catch a large amount of splash runoff. Additionally, at least PDMS can be made clear or otherwise highly transparent (e.g., if sufficiently thin). Thus a splash guard 101 composed of clear PDMS should not be easily detectable or deplete from the aesthetics provided by an, e.g., underlying granite back splash that the splash guard 101 protects.

The splash guard and lip can be manufactured altogether as one complete product with a suitable mold that shapes the guard and the lip during the manufacture and curing of the guard. Some embodiments may choose to eliminate the bottom lip 102.

2. Flexible/Removable Dry Erase Marker Board System

Figure 2:
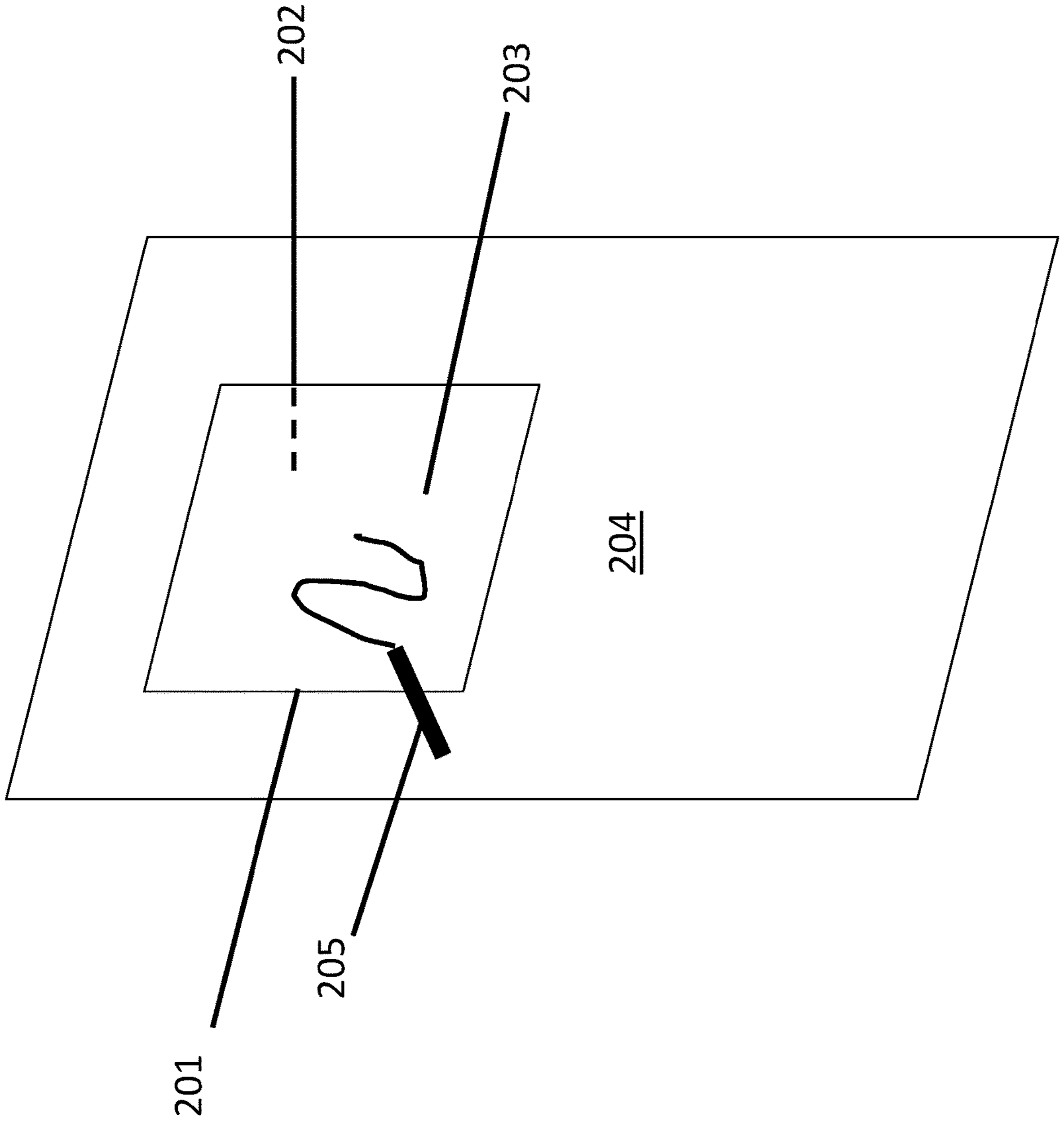
FIG. 2 shows a dry erase marker board.

FIG. 2 shows another application in which a solid wetting adhesive is used as a dry erase marker board 201. Here, the marker board 201 can be adhered on its back side 202 to any high surface energy substrate 204 such as a stainless steel refrigerator door, a glass window, a glass door, a hard plastic window, etc. Standard dry erase markers have been observed to write freely on the front side 203 of the board 201 no differently than a standard whiteboard. Like the splash guard 101 of FIG. 1, the front side 203 of the marker board 201 acts as a low surface energy, non-stick substrate which gives the board its substantially dry erase properties (although dry erase marker can be removed from the board 201 without application of any liquid, application of some very minor amount of liquid, e.g., water, has been observed to assist the removal process). Here, not only have standard dry erase marker 205 ink been easily wiped away but also permanent markers have also been easily wiped away.

In various embodiments, 1 mm thick PDMS sheets of 40 duro or less were successfully used as a dry erase marker board 201. In various embodiments, the PDMS, which is more naturally clear, was colored to white or off-white to be more aesthetic and/or more consistent in appearance to a traditional marker board. However, heavy/opaque coloration of a PDMS sheet increased the PDMS sheet's surface energy and/or hardness as compared to a clear/transparent PDMS sheet. In one experiment, a 40 duro solid opaque white 1 mm thick PDMS sheet exhibited adhesion that was on the borderline of being acceptable whereas a 40 duro clear 1 mm thick PDMS sheet demonstrated adhesion that was well within acceptable limits (Notably, the opaque sheet could be made to demonstrate easily acceptable adhesion by wetting its back side with water prior to application to the substrate. The addition of the water is believed to increase the softness of the overall interface between the sheet and the substrate).

As such, in an embodiment, a reduced color concentration 40 duro PDMS sheet exhibited acceptable adhesion. That is, unlike the opaque white sheet which was generally not translucent, the reduced color concentration sheet exhibited some translucency. The increased translucency/reduced color concentration is believed to bring the PDMS sheet's surface energy and/or softness properties closer to native/clear PDMS having lower surface energy and/or hardness than the opaque white PDMS sheet.

A further complication, however, is the appearance of "wet spots" with the semi translucent PDMS sheet. Here, when adhered to a substrate of different color than the semi translucent PDMS sheet, regions of strong wetting between the semi translucent PDMS sheet and the substrate are clearly visible through the semi translucent PDMS sheet. For example, when the white/off-white semi translucent PDMS sheet is adhered to a solid gray stainless steel substrate, dark wet spots where the PDMS sheet is strongly adhering to the substrate are clearly visible on the front (writable) side of the PDMS sheet. A solution is to increase the thickness of the semi-translucent sheet. Here, for example, both the opaque sheet and the semi-translucent sheet that exhibited wet spots were 1 mm thick. A 3-10 mm thick reduced color concentration PDMS sheet, however, became sufficiently opaque (because of the increased thickness) to hide such wet spots, while, maintaining the overall reduced color concentration provided for sufficiently low surface energy and/or low hardness to exhibit acceptable adhesion. Here, any PDMS sheet at or under 40 duro should be workable. Lower duro ratings, as discussed above, can be used to enhance adhesion for thicker sheets.

In still yet another embodiments, dark colored (black) 1 mm thick PDMS sheets of 40 duro or less were successfully used as a dry erase marker board without any real restriction on the pigment or coloring concentration. That is, unlike the white or off-white embodiments which required reduced pigment or reduced coloring concentrations to effect acceptable wetting behavior, by contrast, dark colored (black) PDMS sheets did not exhibit any effective increase in surface energy or hardness on account of their coloring and were simply manufactured as fully opaque black PDMS sheets of 40 duro or less that demonstrated suitable adhesiveness to hard substrates (e.g., stainless steel refrigerator, glass, woods, etc.). Other fully colored PDMS sheets (pink, orange) of 40 duro or less have also demonstrated suitable adhesion. It is believed that PDMS sheets of 40 duro or less of all sorts of colors (e.g., grays, blues, purples, browns, greens, oranges, pinks, etc.), dark or otherwise, can be manufactured at nominal color concentration levels and still demonstrate sufficient adhesion. It is conceivable that the white/off-white PDMS sheets either included an anomaly in their manufacture, and/or, something about the white/off-white pigmentation specifically caused properties in the PDMS sheets that are dis-favorable for wetting (e.g., increased surface energy or hardness).

Additionally, brightly colored ink (e.g., "fluorescent", "neon" or white) markers when written directly upon the darker/black PDMS sheet were easily visible against the darker/black PDMS sheet. That is, brightly colored markers "stood out" against the dark PDMS sheet making it easy to discern/comprehend/visualize the matter that was written on the sheet (e.g., words, drawings, etc.). Some of the better working bright ink marker colors included white, and fluorescent versions of any of the following: blue, green, purple, red, orange, pink, gold, silver and yellow.

Many brightly colored markers are water based markers (e.g., "liquid chalk") which is distinctive from nominal dry erase board markers which are nominally alcohol or isopropanol based. Here, water has a noticeably higher surface energy than either alcohol or isopropanol (water has a surface energy of approximately 72 dynes/$cm^2$, whereas ethyl alcohol has a surface energy of approximately 21-22 dynes/$cm^2$, and isopropanol has a surface energy of approximately 23 dynes/$cm^2$). Consistent with the above discussions concerning the strength of wetting adhesion being a function of the difference in surface energy between the wetting agent and the substrate, the use of water based markers against a low surface energy sheet (e.g., PDMS) is believed to result in better wetting adhesion of the ink to the low surface energy sheet than other kinds of markers. Nevertheless, the wetting adhesion is not so strong that the water based marker ink cannot be dry erased like a traditional dry erase board system. Not unlike traditional dry erase board systems, some ink particle residue can remain after a pure dry erasure—particularly if the ink has set and dried after an extended period of time on the sheet (e.g., a few days). However, like traditional dry erase board systems, the residue is easily removed with a paper towel or dry marker board eraser after application of water or marker board cleaner to the sheet and/or the towel/eraser.

It is possible that certain marker inks will not sufficiently wet to a flat, smooth silicone flexible markerboard. For example, if the surface energy of marker ink is comparable to that of PDMS, the marker ink has a propensity to form undesirable "beads" when written on a flat PDMS surface (rather than form a desired full-bodied "stripe" on the PDMS surface through wetting). As such, according to various additional embodiments, the surface of the silicone sheet marker board that is to be written on is deliberately roughened so as to be something other than flat and smooth. The surface roughness is believed to present resistance to the ink's fluid flow on the silicone surface thereby diminishing, lessening or preventing the marker ink liquid from drawing into itself, "balling-up" and forming beads on the silicone surface. Without the ability to bead, when written on a surface roughened silicone surface, the ink appears much like that of the desired/intended stripe (the ink forms pools in the "valleys" that exist throughout the roughened surface).

Here, inducing surface roughness (e.g., having rms in fractions of millimeters (e.g., 0.05 mm, 0.04 mm, etc.), or even less) to the silicone surface to be written on will prevent the beading of the markerboard ink. Generally, silicone manufacturers will specify a smooth/gloss or "matte" surface finish, where, the matte surface finish has some roughness as compared to a gloss finish (which is substantially flat and smooth). Generally, the Applicants have found standard matte finish from silicone sheet manufacturers to be sufficient to prevent beading of marker inks whose surface energy is believed to be comparable to that of the silicone substrate. Surface roughening can be induced directly from the mold that is used to form the silicone sheet, or, conceivably, some post processing can be applied to one side of a silicone sheet to roughen that side (e.g., a non uniform chemical and/or vapor etching process). Marker inks that have been observed to benefit from surface roughening on a PDMS surface include colored water based inks, colored ethyl alcohol based inks, colored isopropyl based inks and colored isopropanol based inks.

Thus to summarize, a flexible, dark colored, low hardness, low surface energy solid silicone sheet to act as a "marker board" and a bright colored water based marker to write on the sheet serves as an ideal marker board system where the "board" is capable of adhesion to many different kinds of hard, smooth surfaces (e.g., stainless steel refrigerator door, glass window, glass door, hard wood cabinet, etc.). Other similar marker board systems where the flexible sheet is colored a dark color other than black or another color generally are believed to be readily realized from the discoveries described herein. Additionally, the surface that is written on can be roughened to prevent beading of certain marker inks on the surface.

In various embodiments, it is believed that the adhesive sheet marker board 201 can be painted on, e.g., with silicone paints (e.g., polysiloxane paint) to provide permanent visual features on the marker board. For example, a grid whose spaces correspond to different days of a week or days of a month may be painted on the marker board to provide a permanent visual grid that is not wiped away when dry erase marker content on the board is wiped away.

Being flexible/removable, the marker board is also easily removed and reapplied to one or more different vertical high surface energy substrates.

In various related embodiments, the "back side" of a solid wetting adhesive sheet is applied to a high surface energy substrate (such as a stainless steel refrigerator door) and a marker board structure having sufficiently high surface energy at its back side to applied to the front side of the solid wetting adhesive (the back side is also flat). That is, a marker board/solid wetting adhesive/substrate multi-layer structure is formed. The solid wetting adhesive wets to both the high surface energy substrate and marker board back side which vertically suspends the marker board.

In one embodiment, the marker board is composed of a magnetic vinyl sheet that is laminated with a high gloss dry erase enamel or other dry erase coating or sheet. The magnetic vinyl sheet is believed to have sufficiently high surface energy at least from the iron and/or nickel and/or other magnetic metal materials that provide the vinyl with magnetic properties at its backside. In another embodiment, just the laminate sheet is applied to the solid wetting adhesive (the laminate material has high enough surface energy that the underlying solid wetting adhesive wets to it). In yet other multi-layer embodiments, marker boards having a pressure sensitive adhesive on its back side are applied to the solid wetting adhesive and demonstrate acceptable adhesiveness at the marker board/solid wetting adhesive interface. Note that in any of these embodiments, the marker "boards" may be thin flexible sheets themselves such that the entire marker board system is flexible. However, the principles described above can also be applied to yet other embodiments where a traditional marker board structure is applied to the solid wetting adhesive either through wetting because the traditional marker board structure has a material of sufficiently high surface energy on its back surface (and its back surface is flat) or has an adhesive on its back surface.

In any of the embodiments described above, it has been observed by the Applicants that black or otherwise darker colored marker board surfaces (whether being the solid wetting adhesive itself or a marker board structure that is adhered to the solid wetting adhesive) look most attractive when suspended from a stainless steel refrigerator door.

3. Vertical Suspension Systems

FIG. 3*a* shows another application in which a solid wetting adhesive is used as a platform for securing a hook or other mechanical feature that is used to vertically suspend/hang an item or otherwise vertically fix an item in place to a high surface energy surface. As observed in FIG. 3, the system includes a solid wetting adhesive 301 that is wetted to a high surface energy substrate 304 on its back side 302. A mechanical feature 306 is adhered to the front side 303 of the solid wetting adhesive 301 with a glue 305 that forms a chemical bond with the front side 303 of the solid wetting adhesive 301. That is, the glue 305 (e.g., a silicone gel glue) chemically reacts with the front side 303 of the silicone (e.g., PDMS) solid wetting adhesive 301 to form a strong chemical bond. Thus, the adhesive system is characterized by wetting adhesion at the sheet back side 302 and chemical bond/reaction adhesion at the sheet front side 303. In an embodiment, the glue 305 is a silicone glue composed of polydimethylsiloxane or dimethyl polysiloxane which is believed to promote the chemical bonding between the glue 305 and the sheet front side 303. Other reactive glues, such as, cyanoacrylate glues or epoxies have also been observed to adhere to the silicone front side 303 through chemical reaction.

The mechanical feature 306 can be composed of any material that the glue 305 also natively adheres/bonds to. Examples include, for a standard silicone or cyanoacrylate glues, glass, ceramics, metals, plastics, etc. The mechanical feature 306 can be any feature that is designed to support the vertical suspension of another item that is to be hung or suspended from the mechanical feature 306. Examples include hooks, clips, posts, velcro strips, containers, canisters, frames, clasps, trays, braces, etc.

FIG. 3*b* shows various enhancements to the system of FIG. 3*a*. Here, as observed in FIG. 3*a* there is mechanical support feature 307 between the mechanical feature 306 (e.g., a hook) that an item is to be suspended from and the front side 303 of the solid wetting adhesive material (feature 306 can be glued or otherwise adhered to feature 307). Here, it is believed that wetting adhesion to the substrate 304 at the adhesive's back side 302 can be enhanced with the introduction of a high surface energy material at the adhesive front side 303. Here, for instance, if the mechanical support feature 307 is composed of a high surface energy material such as a metal, it is believed that two forces are applied to the solid wetting adhesive 301 that cause the adhesive to stretch out over the substrate 304.

A first force is applied by the high surface energy substrate 304 as discussed at length above. However a second force is also applied by the high surface energy feature 307 that resides at the adhesive front side 303. Thus, the high surface energy feature 307 acts to "boost" the adhesion between the solid wetting adhesive 301 and the substrate 304 by providing an additional driving force that causes the adhesive 301 to spread out even more against the surface of the substrate 304 than it otherwise would have without the feature 307. The added spreading out corresponds to greater a wetting bond. In essence, the adhesive 301 is sandwiched between two high surface energy materials 304, 307 that drive it to wet further to the substrate rather than merely being driven by one high energy surface energy material (the substrate 304). Adhesive systems having such a sandwich structure have been observed to exhibit greater wetting adhesion than non sandwiched structures.

Another improvement that the support feature 307 can be utilized for is the prevention of delamination in response to the weight that is supported by the adhesive system. Here, as observed in FIG. 3*b*, the mechanical feature 306 (e.g., hook) that actually supports the weight to be suspended, is placed above the center of mass, mid-point or rotation point 310 of the support feature 307. Here, when the full weight is applied to the mechanical feature 306, the mechanical feature 306 will desire to "rotate out" along arc 308 from the surface of the adhesive 301.

If such rotate out action where to happen freely, it could cause delamination of the adhesive (the rotating out would act to pull the adhesive off the substrate in a delaminating fashion that creeps up along the adhesive/substrate interface from the point where feature 306 is rotating away toward the top edge of the adhesive). By placing feature 306 above the center of mass 310 of feature 307, such rotation is minimized because it is counterbalanced by a strong "rotate in" action along arc 309 of feature 306 toward the substrate 304. In essence, the longer level arm of rotation action 309 limits the distance of the rotate out action 308. By limiting the distance of the rotate out action 308, delamination/peeling of the solid wetting adhesive is thwarted.

Note that the systems of FIGS. 3*a* and/or 3*b* can be used to support the vertical suspension of practically any item whose overall weight does not override the adhesion of the system. Here, as mentioned above, the systems of FIGS. 3*a* and/or 3*b* can be used to support computing systems in, e.g., IOT applications. For example, feature 306 may correspond to a frame or other mechanical holder of a computer system or smart appliance (e.g., smartphone, tablet computer, camera, smart camera, smart sensor, etc.). In yet other embodiments, the item to be suspended, rather than a hook, frame or other in between structure 306, may be adhered to the front side 303 of the sheet directly (or high surface energy wetting boost structure 307) with a glue or epoxy.

Note that the flexible marker board described above with respect to FIG. 2 may also have adhered to its front side with a system like those of FIGS. 3*a,b* a clap or tray to hold one or more pens or eraser.

In still yet other embodiments, a high surface energy material having a flat back side is used in place of glue 305. For instance, if mounting feature 306 is composed of a high surface energy material (e.g., metal, hard plastic, etc.) and has a flat back side the solid wetting adhesive may wet to it without the use of glue 305. Alternatively, a sheet of high surface energy material (e.g., a metal sheet, the magnetized vinyl sheet or laminate sheet described above with respect to the marker board system, etc.) may be applied to the front side of the solid wetting adhesive so that the solid wetting adhesive wets to it. A mounting feature 306 or item of interest can then be attached to the high surface energy material by various mechanisms (e.g., reactive glue, traditional glue that wets then hardens, velco, magnetism, etc.).

4. Double Stick Tape

FIG. 4 shows another embodiment in which a very low softness silicone strip 401 is used as double side adhesive tape to, e.g., suspend items of interest 402 (e.g., calendars, photos, etc.) from, e.g., a stainless steel refrigerator door or window 403. Here, as is known, magnets were commonly used to adhere such items of interest to traditional refrigerators which exhibited magnetism. Stainless steel refrigerator doors, however are not magnetic. As such, the traditional convenience of adhering items of interest to a refrigerator door with magnets is no longer available with more modern steel refrigerator doors not being magnetic.

In FIG. 4, however, a strip of low hardness low surface energy silicone can be used as a form of double side adhesive tape 401 that provides the functional equivalence of traditional magnets. Here, like a magnet, an unlike actual tape, the low hardness, low surface energy silicon strip 401 can be repeatedly removed and reapplied to the refrigerator door (or window) without leaving a hard to remove tacky residue and without losing any adhesiveness with each removal/reapplication cycle.

As discussed above, the strip 401 adheres to the refrigerator door 403 (or window) according to solid wetting adhesion principles as discussed at length above. Additionally, certain items, such as photographs and hard plastics 403 at least (such as the hard plastic backing of a poster board, caulk board or paper note dispenser) appear to have sufficiently high surface energy such that the silicone strip also 401 wets to the item of interest 403. Thus, whereas the system of FIGS. 3*a* and 3*b* above were based on chemical bonding on the front side of the solid wetting adhesive, by contrast, the system of FIG. 4 is defined by solid wetting on the front and back sides of the solid wetting adhesive 401.

Here, in order to promote the double side adhesive tape to wet to items having perhaps lower surface energy than metals, glass, etc., (such as photographs, poster boards, paper products), the double stick tape is composed of extremely low hardness low surface energy silicone such as PDMS with 10 duro hardness.

Note that in any of the embodiments described above with respect to FIGS. 1, 2, 3*a*,3*b* and 4 the single silicone sheet 101, 201, 301, 401 may be replaced with a multilayer sheet system. Here, silicone sheets adhere to one another. Thus, any of sheets 101, 201, 301, 401 can be replaced with two or more silicone sheets that are layered upon one another (or that include one or more high surface energy sheets between or interlayered them (e.g., to provide the aforementioned "boost")). As such, features 101, 201, 301, 401 can be more broadly characterized as solid wetting structures that include one or more solid wetting adhesive sheets.

FIGS. 5*a* and 5*b* pertain to corner mounting piece embodiments. Here, corner mounting pieces 501 are made of solid wetting adhesive material. The corner pieces 501 adhere, via wetting, on their back side to the front side of a high surface energy substrate 504 such as a window or stainless steel refrigerator door. A thin item of interest 502 to be suspended from the substrate (e.g., a photograph, a piece of paper, etc.) has a small tip of its corners underneath the pieces 501 (no wetting occurs beneath the small tips of the item of interest 502 because the corner pieces are not in contact with the substrate 502). FIG. 5*b* shows a similar approach in which the corner pieces have slits for easy insertion of the small tips of the item of interest 502 into the corner pieces 501. In another alternate embodiment to that of FIG. 5*b*, the mounting structure is formed as a solid continuous sheet of solid wetting adhesive having slits in its corners (unlike FIG. 5*b* which shows four discrete pieces of solid wetting adhesive).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. An apparatus, comprising:

a marker board system, comprising a) and b) below:

a) a flexible solid elastomer sheet having a flat surface, the flexible solid elastomer sheet having a sufficiently low hardness and surface energy such that the flat surface wets to a flat, smooth surface of metal; and, b) a marker pen having ink that is dry erasable from a surface of the flexible solid elastomer sheet that is opposite the flat surface of the flexible solid elastomer sheet.

2. The apparatus of claim 1 wherein a ratio of a respective surface energy of the metal to the surface energy of the flexible solid elastomer sheet is at least 10:1.

3. The apparatus of claim 1 wherein the flexible solid elastomer sheet comprises material selected from the group consisting of:

polydimethylsiloxane;
fluorosilicone;
polymethyltrifluoropropylsiloxane;
polymethylnonafluorohexylsiloxane;
polytetrafluroethylene;
polyhexafluoropropylene;
polyoxyhexafluoropropylene;
polyheptadecafluorodecylmethylsiloxane.

4. The apparatus of claim 1 wherein the ink has a first color and the surface of the flexible solid elastomer sheet that is opposite the flat surface of the flexible solid elastomer sheet has a second color, wherein, the first color is brighter than the second color.

5. The apparatus of claim 1 wherein the flexible solid elastomer sheet comprises material selected from the group consisting of:

polydimethylsiloxane;
fluorosilicone;
polymethyltrifluoropropylsiloxane;
polymethylnonafluorohexylsiloxane;
polyheptadecafluorodecylmethylsiloxane.

6. The apparatus of claim 1 wherein the flexible solid elastomer sheet comprises silicone.

7. An apparatus, comprising:

a marker board system, comprising a) and b) below:

a) a flexible solid elastomer sheet having a flat surface, the flexible solid elastomer sheet having a sufficiently low hardness and surface energy such that the flat surface wets to a flat, smooth surface of metal, the flexible solid elastomer sheet further comprising a roughened surface that is opposite the flat surface of the flexible solid elastomer sheet; and, b) a marker pen having ink that is dry erasable from the roughened surface of the flexible solid elastomer sheet.

8. The apparatus of claim 7 wherein a ratio of a respective surface energy of the metal to the surface energy of the flexible solid elastomer sheet is at least 10:1.

9. The apparatus of claim 7 wherein the flexible solid elastomer sheet comprises material selected from the group consisting of:

polydimethylsiloxane;
fluorosilicone;
polymethyltrifluoropropylsiloxane;
polymethylnonafluorohexylsiloxane;
polytetrafluroethylene;
polyhexafluoropropylene;
polyoxyhexafluoropropylene;
polyheptadecafluorodecylmethylsiloxane.

10. The apparatus of claim 7 wherein the ink has a first color and the surface of the flexible solid elastomer sheet that is opposite the flat surface of the flexible solid elastomer sheet has a second color, wherein, the first color is brighter than the second color.

11. The apparatus of claim 7 wherein the flexible solid elastomer sheet comprises material selected from the group consisting of:

polydimethylsiloxane;
fluorosilicone;
polymethyltrifluoropropylsiloxane;
polymethylnonafluorohexylsiloxane;
polyheptadecafluorodecylmethylsiloxane.

12. The apparatus of claim 7 wherein the flexible solid elastomer sheet comprises silicone.

13. An apparatus comprising:

a marker board comprising a flexible solid elastomer sheet having a flat surface, the flexible solid elastomer sheet having a sufficiently low hardness and surface energy such that the flat surface wets to a flat, smooth surface of metal, the flexible solid elastomer sheet further comprising another surface that is opposite the flat surface of the flexible solid elastomer sheet, wherein, the another surface is roughened to diminish beading of ink written on the marker board.

14. The apparatus of claim 13 wherein a ratio of a respective surface energy of the metal to the surface energy of the flexible solid elastomer sheet is at least 10:1.

15. The apparatus of claim 13 wherein the flexible solid elastomer sheet comprises material selected from the group consisting of:

polydimethylsiloxane;
fluorosilicone;
polymethyltrifluoropropylsiloxane;
polymethylnonafluorohexylsiloxane;
polytetrafluroethylene;
polyhexafluoropropylene;
polyoxyhexafluoropropylene;
polyheptadecafluorodecylmethylsiloxane.

16. The apparatus of claim 13 wherein the flexible solid elastomer sheet comprises material selected from the group consisting of:

polydimethylsiloxane;
fluorosilicone;
polymethyltrifluoropropylsiloxane;
polymethylnonafluorohexylsiloxane;
polyheptadecafluorodecylmethylsiloxane.

17. The apparatus of claim 13 wherein the flexible solid elastomer sheet comprises silicone.

* * * * *